(12) United States Patent
Hooper et al.

(10) Patent No.: US 8,073,017 B1
(45) Date of Patent: Dec. 6, 2011

(54) SYSTEM AND METHOD FOR GENERATING EYE-SAFE HIGH INTENSITY OPTICAL PULSES WITH TWO BACKWARD-SHIFTING RAMAN CELLS

(75) Inventors: William P. Hooper, Severna Park, MD (US); Glendon M. Frick, Lorton, VA (US); Benjamin P. Michael, Falling Waters, WV (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 71 days.

(21) Appl. No.: 12/711,011

(22) Filed: Feb. 23, 2010

Related U.S. Application Data

(60) Provisional application No. 61/154,487, filed on Feb. 23, 2009.

(51) Int. Cl.
*H01S 3/30* (2006.01)
*H01S 3/10* (2006.01)
*H01S 3/08* (2006.01)

(52) U.S. Cl. ................... 372/3; 372/9; 372/99
(58) Field of Classification Search ............ 372/3, 9, 372/99
See application file for complete search history.

(56) References Cited

U.S. PATENT DOCUMENTS

| | | | |
|---|---|---|---|
| 3,515,897 A | 6/1970 | Culver | |
| 4,280,109 A | 7/1981 | Stappaerts | |
| 4,306,195 A | 12/1981 | Stappaerts | |
| 4,575,645 A | 3/1986 | Komine | |
| 4,633,103 A | 12/1986 | Hyman et al. | |
| 5,062,112 A | 10/1991 | Buchman et al. | |
| 5,090,016 A * | 2/1992 | Dewhirst et al. | 372/3 |
| 5,272,717 A | 12/1993 | Stultz | |
| 5,274,494 A * | 12/1993 | Rafanelli et al. | 359/327 |
| 5,337,211 A | 8/1994 | Reiner et al. | |
| 6,151,337 A | 11/2000 | Carlsten et al. | |
| 7,286,283 B2 | 10/2007 | Starodoumov | |

OTHER PUBLICATIONS

Kachen G.I., Lowdermilk W.H., "Relaxation oscillations in stimulated Raman scattering," Phys. Rev. A, vol. 16, pp. 1657-1664 (1977).
Maier M., Kaiser W., Giordmaine J.A., "Backward stimulated Raman scattering," Phys. Rev., vol. 117, pp. 580-599 (1969).
Kazzaz A., Ruschin S., Shoshan I., Ravnitsky G., "Stimulated Raman scattering in methane-experimental optimization and numerical model," IEEE J. Quantum Electron., vol. 30, pp. 3017-3024 (1994).
Carnuth W., Trickl T., "A powerful eyesafe infrared aerosol lidar: application of stimulated Raman backscattering of 1.06 m radiation," Rev. Sci. Instrum., vol. 65, pp. 3324-3331 (1994).
Hanna D.C., Pointer D.J., Pratt D.J., "Stimulated Raman scattering of picosecond light pulses in hydrogen, deuterium, and methane," IEEE J. Quantum Electron., vol. 22, pp. 332-336 (1986).
Spinhirne J.D., Chudamani S., Cavanaugh J.F., Bufton J.L., "Aerosol and cloud backscatter at 1.06, 1.54, and 0.53 m by airborne hard-target-calibrated Nd:YAG/methane Raman lidar," Appl. Opt., vol. 36, pp. 3475-3490 (1997).
Patterson E.M., Roberts D.W., Gimmestad G.G., "Initial measurements using a 1.54-m eyesafe Raman shifted lidar," Appl. Opt, vol. 28, pp. 4978-4981 (1989).
International Search Report and Written Opinion, PCT/US2010/025091, dated Feb. 23, 2010.

* cited by examiner

*Primary Examiner* — Patrick Stafford
(74) *Attorney, Agent, or Firm* — Amy L. Ressing; Sally A. Ferrett

(57) ABSTRACT

A system and method for converting a pulsed beam of irradiation from a laser operating at a first wavelength to a pulsed beam of irradiation at a second, Stokes, wavelength. The system includes two Raman cells filled with the same Raman-active gas. The second cell receives a backward-propagating Stokes pulse beam from the first Raman cell, with the backward-propagating Stokes pulsed beam entering the second Raman cell in a direction opposite to the direction of travel of the incoming laser pulses at the first wavelength. The second Raman cell generates a high intensity output pulsed beam at the second, Stokes, wavelength. The system can produce a high intensity eye-safe pulsed beam.

15 Claims, 8 Drawing Sheets

SYSTEM AND METHOD FOR GENERATING EYE-SAFE HIGH INTENSITY OPTICAL PULSES WITH TWO BACKWARD-SHIFTING RAMAN CELLS

CROSS-REFERENCE TO RELATED APPLICATIONS

This Application is a non-provisional application of and claims the benefit under 35 USC 119(e) of U.S. Provisional Application 61/154,487 filed on Feb. 23, 2009, the entire disclosure of which is incorporated herein by reference.

BACKGROUND

1. Technical Field

This application is related to generation of eye-safe optical pulses, and more particularly, to generation of eye-safe optical pulses using the Raman-scattering effect to wavelength shift an infrared pulse.

2. Related Technology

Optical pulses are useful for communication, range finding, imaging, and other purposes. Powerful optical pulses can be safely transmitted through the atmosphere in the 1400-2000 nanometer band without harming human eyes. In this wavelength band, the eye's humor absorbs the optical radiation, preventing damage to the retina. Therefore, optical pulses in this band can be much more intense than similar duration pulses in the visible and near-infrared bands below 1400 nanometers. As a result, active optical devices such as Light Detection and Ranging (LIDAR) systems and range finders can be safely operated more effectively in the 1400-2000 nm band than in shorter visible and near infrared wavelengths. However, laser processes for producing pulses in the 1400-2000 nm band are limited.

Techniques for shifting the wavelength of optical pulses from powerful near-infrared lasers, such as the Nd:YAG lasers, to the 1400-2000 nm band have been sought.

W. Carnuth and T. Trickl, in "A powerful eye-safe infrared aerosol lidar: Application of stimulated Raman backscattering of 1.06 μm radiation", Rev. Sci. Instrum., Vol. 65, No. 11, pp. 3324-3331, November 1994, discloses using a single backward Raman cell containing deuterium to produce a 1560 nm pulse. The laser pulse is focused into the center of the seed cell. The very short pulses generated with this technique sometimes had damaged optics, and the system appears to have been limited in efficiency to about 20%.

Xu et al., Journal of Modern Optics, Vol. 10., pp 1527-1536, 1999, discloses using a ultraviolet laser pulse at 249 nm with forward scattering from a Raman seed cell to amplify backward scattering in a pump cell, with both cells containing high pressure methane.

Single forward scattering Raman cells with methane have been disclosed in Spinhirne et al., Appl. Optics, Vol. 36, pp. 3475-3490, 1997 and in Mayer and Spuler, Applied Optics, Vol. 43, pp. 3915-3924, 2004. Forward scattering cells filled with methane typically require gas circulating pumps and diode seed lasers operating at the Stokes wavelength.

SUMMARY

An aspect of the invention is directed to an optical system for converting a pulsed beam of irradiation from a laser operating at a first wavelength to a pulsed beam of irradiation at a different second wavelength. The system includes a first Raman cell filled with a Raman-active gas, and a second Raman cell filled with the Raman-active gas. The second cell is arranged to receive a backward-propagating Stokes pulsed beam from the first Raman cell at the second wavelength, with the backward-propagating Stokes pulsed beam entering the second cell in a direction opposite to the direction of travel of the incoming laser pulses at the first wavelength. The second Raman cell generating an output pulsed beam at the second wavelength.

Another aspect of the invention is directed to an optical system for converting a pulsed beam of irradiation from a laser operating at a wavelength of about 1064 nm to a pulsed beam of irradiation at about 1560 nm. The system includes a first Raman cell filled with high pressure deuterium gas, a second Raman cell filled with high pressure deuterium gas, with the second cell arranged to receive a backward-propagating Stokes pulsed beam from the first Raman cell at 1560 nm wavelength. The backward-propagating Stokes beam enters the second cell in a direction opposite to the direction of travel of the incoming laser pulses at 1064 nm, and generates an output pulsed beam at 1560 nm wavelength.

Another aspect of the invention is directed to a method for converting a pulsed beam of irradiation from a laser operating at a first wavelength to a pulsed beam of irradiation at a different second wavelength. The method includes transmitting the pulsed laser beam into a first Raman cell filled with a Raman-active gas, transmitting the pulsed laser beam into a second Raman cell filled with the Raman-active gas. The second cell receives a backward-propagating Stokes pulse beam from the first Raman cell at the second wavelength, with the backward-propagating Stokes pulsed beam entering the second cell in a direction opposite to the direction of travel of the incoming laser pulses at the first wavelength. The second Raman cell generates an output pulsed beam at the second wavelength traveling in a direction opposite to the direction of travel of the incoming laser pulses at the first wavelength.

DETAILED DESCRIPTION OF THE INVENTION

Raman scattering from gasses is a process that can shift the wavelength of a laser pulse. When laser light is focused into cells containing high pressure hydrogen, deuterium, or tritium, the light undergoes Raman scattering. The wavelength is shifted by the Raman (or Stokes) scattering. The scattering creates pulses that propagate in both the forward and backward directions. The nature of the Stokes pulse that is scattered in the backward direction is significantly different than that of the Stokes pulse that is scattered in the forward direction. In the forward direction, the Stokes pulse is the same length as the length of the input laser pulse, and the photon density of the Stokes pulse has a maximum possible photon density equal to the input laser pulse. In the backward direction, the Stokes pulse is shorter in length than the laser pulse and the photon density can be higher than the density of the input laser pulse. When generated by the same laser pulse, the backward-scattered Stokes pulse is shorter and more intense than the forward-scattered Stokes pulse.

Figure 1A:
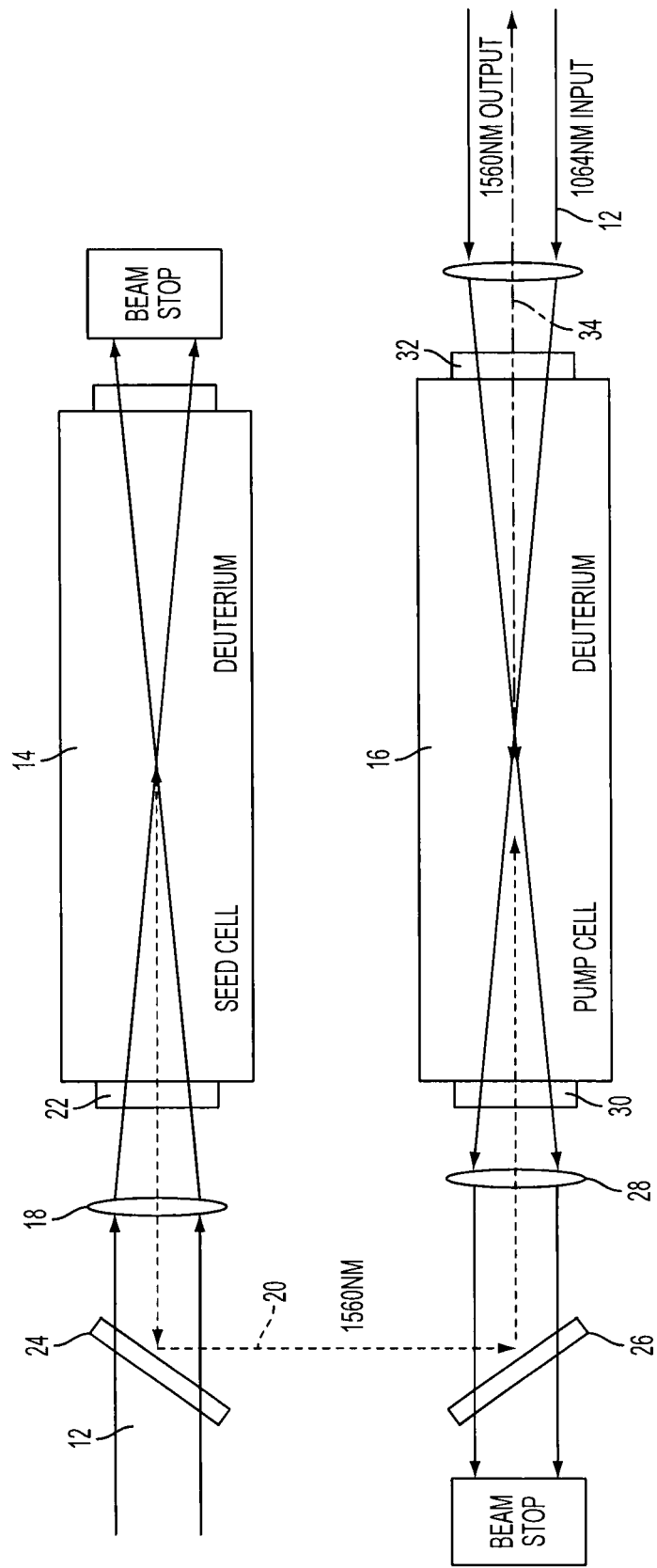
FIG. 1A shows an optical pulse generator having two Raman cells arranged so the backward propagating Stokes pulse output of the first cell is input to a second Raman cell.

FIG. 1A shows an optical pulse generator having two Raman cells, a seed Raman cell 14 and a pump Raman cell 16.

A laser generates a pulsed laser beam 12. In this example, the laser is a Nd:YAG laser generating 1064 nm pulses. The 1064 nm collimated laser beam 12 is input to the seed cell 14 and the pump cell 16.

Each of the Raman cells 14 and 16 is filled with a high pressure gas, which can be hydrogen, deuterium, or tritium. An appropriate pressure range depends on the gas in the Raman cell. For example, deuterium cells should be at a pressure of between about 10 and 40 atm, although higher pressures are possible. The cells should both have the same gas. Note that other Raman-active gasses are also possible. For example, methane, silane, germane gasses can be used, although intense laser pulses can break down these gases into solid material (such as soot for methane) that can coat windows, reduce cell efficiency, and damage the interior of cell windows. Deuterated hydrogen is another suitable Raman-active gas, however, the deuterated hydrogen Raman cell requires chilling.

The laser beam is focused at the center of the seed cell 14 by a lens 18.

When the laser pulses are focused into the Raman seed cell 14, a series of shorter-duration backward-propagating Stokes pulses 20 can be produced. The wavelength of the Stokes (or Raman) pulsed beam 20 depends on the gas in the Raman cell. For example, with an input pulse of 1064 nm, hydrogen Raman cells will generate a 1907 nm wavelength pulse, deuterium cells will generate a 1560 nm pulse, tritium cells will generate a 1440 nm pulse, and chilled deuterated hydrogen (HD) cells will generate a 1720 nm pulse.

In this example, the seed cell and pump cell each contains high pressure deuterium ($^2$H or D). The backward-scattered Stokes pulses will be shorter than the laser pulses. For example, for a laser pulse length of 8 nanoseconds (ns), the Stokes pulse length will be approximately 3 ns.

The backscattered 1560 nm Stokes beam 20 exits the seed cell window 22, is directed to the pump cell 16 by dichroic mirrors 24 and 26, and passes through the lens 28 and pump cell window 30 into the pump cell 16. The lens 28 focuses the Stokes beam 20 at the center of the pump cell 16.

The original 1064 nm laser pulse 12 is focused into the pump cell 16 from the opposite direction through pump cell window 32. The optical path lengths to the cells are set to allow the Stokes pulse 20 and the laser pulse 12 to pass through the center of the pump cell 16 at the same time, with the optics aiming the Stokes pulse and the laser pulse so they meet at the same focus spot in the center of the pump cell 16.

The pump cell 16 amplifies the seed beam 20 from the seed cell and produces an output pulse 34, which propagates counter to the 1064 input laser pulse 12. The output Raman pulse 34 is composed of both an amplified seed beam and a backward propagating Raman/Stokes generated as a result of the passage of the laser beam 12 through the deuterium gas in the pump cell 16. The output pulse 34 exits through the cell window 32.

The output pulse 34 can be used as the transmitter pulse for LIDAR measurements, or for other applications in which eye-safe laser pulses are needed. In the example with Deuterium cells, the output Stokes pulse 34 will have a wavelength of 1560 nm. The output pulse 34 is higher in intensity than the backward scattered Stokes pulse 20, as will be discussed further in later paragraphs.

Figure 1B:
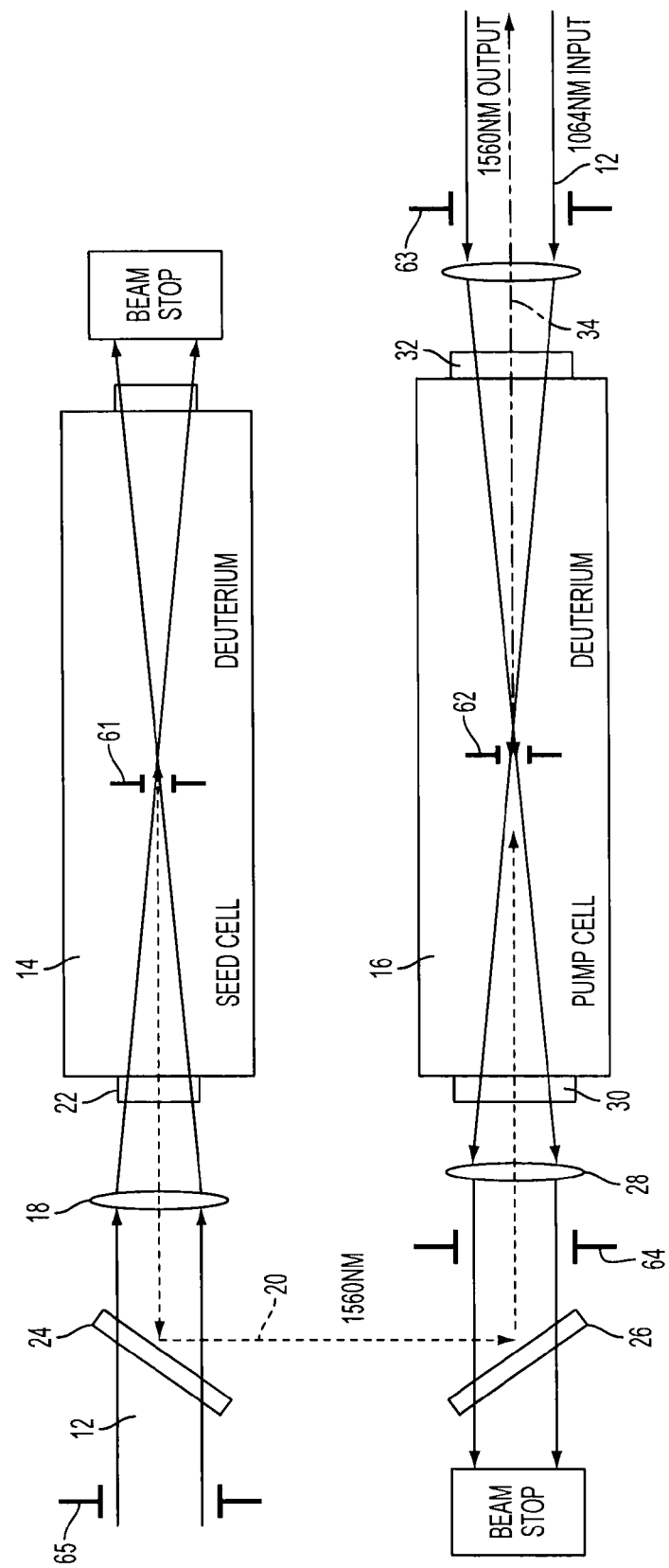
FIG. 1B shows the optical pulse generator of FIG. 1A with pinholes and irises used for initial system alignment.

FIG. 1B shows the optical pulse generator of FIG. 1A with pinholes and irises used for initial system alignment, as discussed in later paragraphs in more detail.

Figure 2:
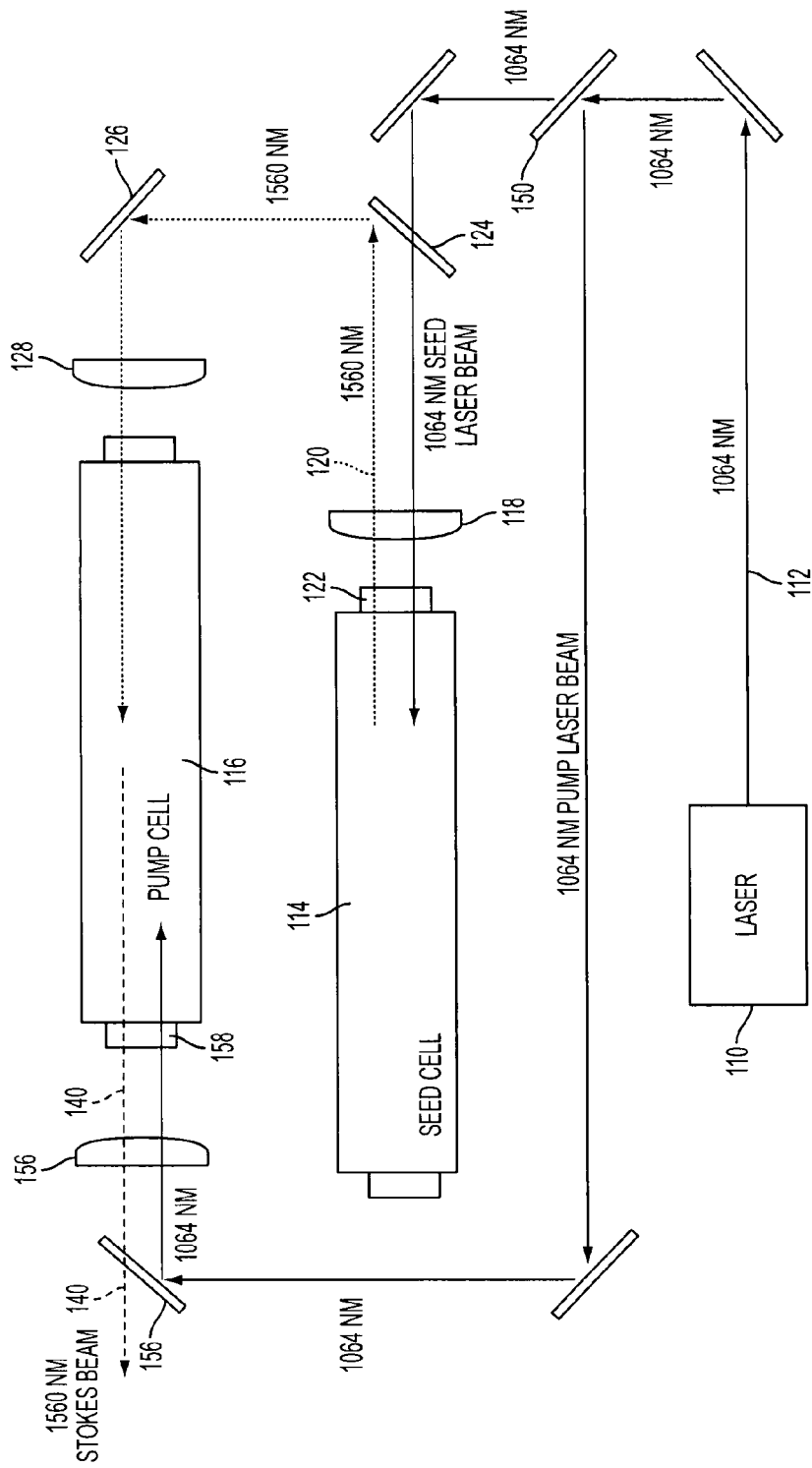
FIG. 2 shows an optical pulse generator with two Raman cells in more detail.
Figure 3:
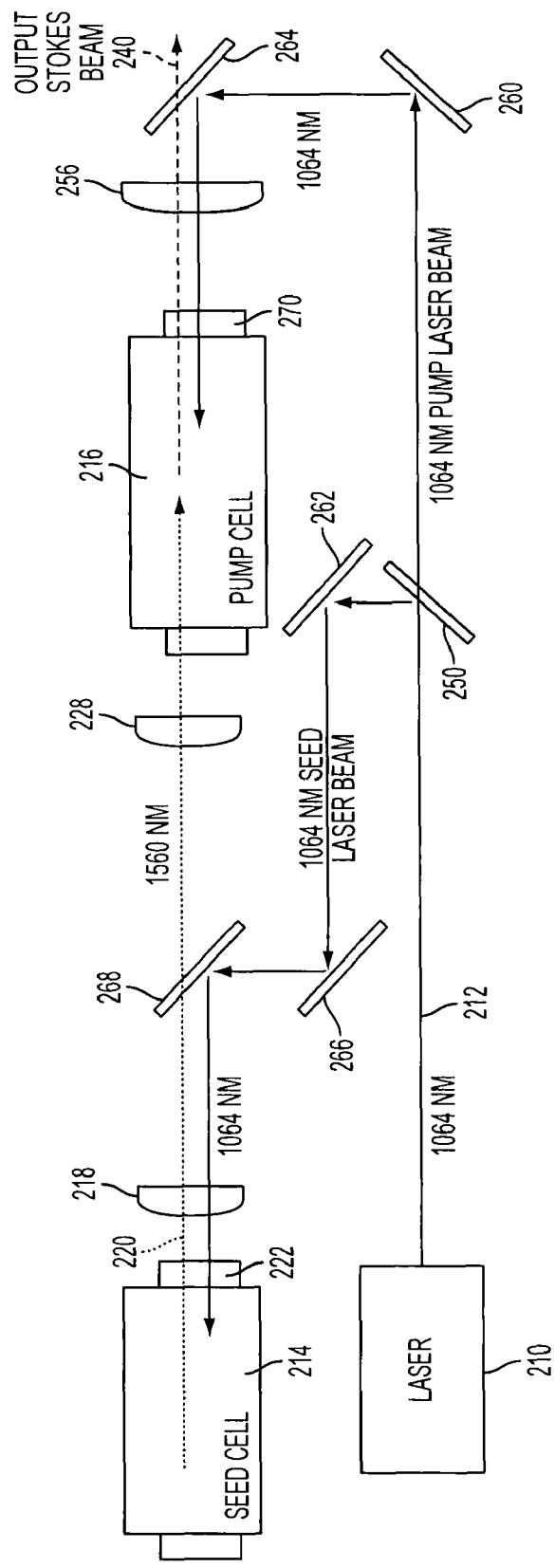
FIG. 3 shows an optical pulse generator with two Raman cells in more detail, with a different arrangement of optical elements for providing the input laser pulsed beam to the first and second Raman cells.

Various optics arrangements for introducing the laser beam into the seed cell and pump cell are possible, as shown in the examples of FIG. 2 and FIG. 3.

FIG. 2 illustrates in more detail an embodiment of a dual Raman-cell system having a Nd:YAG laser 110 generating laser pulses at 1064 nm. Mirrors and a beamsplitter 150 direct a portion of the original pulsed laser beam 112 from the laser source 110 to the seed cell 114, with the remaining portion being directed to the pump cell 116. Between 10% and 40% of the laser pulse energy is transmitted to the seed cell 114, and the remainder, approximately 60% to 90%, is transmitted to the pump cell 116. In this example, approximately 30% of the laser energy is directed to the seed cell 114, and 70% of the laser energy is directed to the pump cell 116. Suitable Raman cell lengths can be in a range of 20 cm to 5 meters. In this example, the Raman cells 114 and 116 are each approximately 1 meter in length.

A planoconvex lens 118 having a 100 cm (1 m) focal length focuses the 1064 laser beam 120 through the seed cell window 122 into the center of the seed cell 114.

The deuterium filled Raman seed cell 114 generates a 1520 nm backscattered Stokes pulsed beam 120. The backscattered Stokes beam 120 propagates counter to the seed laser beam 112, and exits the seed cell 140 from the same cell window 122 through which the seed laser beam 112 entered. A dichroic mirror 124 acts as a short wave pass filter, reflecting the longer wavelength 1560 nm Stokes beam 120 toward the pump cell 116, and allowing the shorter 1064 nm seed laser beam 112 to pass through the mirror to the seed cell 114.

A second planoconvex lens 128 focuses the Stokes beam 120 into the center of the pump cell 116. The 1064 nm original pulsed laser beam 112 is directed to a planoconvex lens 156, which focuses the pulsed laser beam 112 into the center of the pump cell 116. The pulsed laser beam 112 enters the cell through a cell window 158 and travels in a direction opposite to the direction of entry of the Stokes beam 120. The pulsed laser beam 112 meets the Stokes beam 120 in the center of the pump cell.

The output Raman pulse 140 is composed of both an amplified seed beam and a backscattered Stokes beam generated in the pump cell.

The dichroic mirror 154 acts as a long wave pass filter, reflecting the shorter 1064 nm laser beam 112 toward the lens 156, and allowing the longer 1560 nm pulsed output beam 140 to pass from the pump cell 116 through the dichroic mirror 154 and out of the system.

FIG. 3 illustrates a dual Raman-cell system with a deuterium-filled Raman seed cell 214 and a deuterium filled Raman pump cell 216. A pulsed 1064 nm laser beam 212 is generated by the laser 210 and transmitted to a beamsplitter 250, which directs a portion of the beam 212 to the seed cell 214 and the remainder to the pump cell 216. Mirrors 262, 266, and dichroic mirror 268 direct the laser beam 212 to the lens 218, which focuses the 1064 nm laser beam 212 at the center of the seed cell 214. A backward scattering Stokes beam 220 is generated by the seed cell 214, propagates opposite to the input laser beam 212, and exits the seed cell 214 through the same cell window 222.

The dichroic mirror 268 acts as a long wavepass filter to allow the allow the shorter 1064 nm seed laser beam 212 to be reflected toward the lens 218 and seed cell 214, and to allow the longer wavelength Stokes beam 220 to pass from the seed cell 214 through toward the lens 228 and the pump cell 216.

The deuterium-filled Raman pump cell 216 generates a backscattered Stokes pulsed beam at a wavelength of 1560 nm. The backscattered Stokes beam propagates counter to the seed laser beam 212. The output Raman pulse 240 is composed of both an amplified seed beam and the backscattered Stokes beam generated in the pump cell. The output pulse 240 exits the pump cell 216 through the cell window 270.

The following theory of operation of the dual-cell Raman system is provided for information, without intending to be bound by this particular theory of operation.

Raman scattering is an elastic scattering process that changes the wavelength of the scattered photon from the wavelength of the incident photon and also changes the internal energy of the scattering medium. In Stokes scattering molecules absorb energy, thus increasing the wavelength of the scattered photons. Anti-Stokes scattering, which causes a decrease in wavelength, is not addressed here. When illuminated by the Nd:YAG laser (1064 nm), the deuterium shift of 2987 cm$^{-1}$ generates the Raman beam at 1560 nm.

The scattering is described by Raman theory and is caused by both spontaneous and stimulated scattering as $$\frac{d\eta_s^T}{dz} = \alpha \eta_L \eta_s^T + \beta \eta_L \qquad \text{Eq. (1)}$$

where $\eta_s^T$ is the total number density of Stokes-scattered photons, $\eta_L$ is the number density of the input laser beam, z is the distance that the incident photons travel, $\alpha$ is the stimulated emission coefficient, and $\beta$ is the spontaneous emission coefficient. The stimulated and spontaneous coefficients are defined to be:

$$\alpha = g_r h \nu_L c/\eta_L \qquad \text{Eq. (2)}$$

and $$\beta = N_o \frac{d\sigma}{d\Omega} \frac{\nu_L}{\nu_s} \frac{n_s}{n_L} \Delta\Omega \qquad \text{Eq. (3)}$$

where $g_r$ is the steady state gain coefficient, hI is Planck's constant, $\nu_L$ and $\nu_s$ are the frequencies for the laser and Stokes photons, respectively, $n_L$ and $n_s$ are the refractive index at the laser and Stokes wavelengths, $N_o$ is the molecular density, $d\sigma/d\Omega$ is the Raman scattering cross section, and $\Delta\Omega$ is the solid scattering angle. The gain coefficient of deuterium is approximately $3.7 \times 10^{-12}$ m w$^{-1}$, according to D. C. Hanna, D. J. Pointer, and D. J. Pratt, "Stimulated Raman scattering of picosecond light pulses in hydrogen, deuterium, and methane," IEEE J. Quantum Electron., Vol. 22, pp. 332-336 (1986).

When the input beam is restricted to photons propagating along one axis, the stimulated Raman scattering is composed of photons that propagate either in the forward or backward direction, according to:

$$\eta_s^{T[z,t]} = \eta^{F[z^F,t]} + \eta^{B[z^B,t]} \qquad \text{Eq. (4)}$$

where the F and B superscripts denote forward and backward propagation, respectively, $z^F = z + Ct/n$, $z^B = z - Ct/n$, and Equation (1) is split into the following terms:

$$d\eta_s^F/dz^F = \alpha \eta_L \eta_s^F \beta \eta_L \qquad \text{Eq. (5)}$$

and $$d\eta_s^B/dz^B = \alpha \eta_L \eta_s^B + \beta \eta_L. \qquad \text{Eq. (6)}$$

Each Stokes photon is the result of partitioning the energy of the incident photon between the medium and the emitted photon. For every photon created by Stokes scattering, a photon is destroyed, and the relationship between the three beams is $$\frac{d\eta_L}{dz^F} = -\left(\frac{d\eta_s^F}{dz^F} + \frac{d\eta_s^B}{dz^B}\right). \qquad \text{Eq. (7)}$$

In Equations (5)-(7), linear scattering processes that result in beam losses can be ignored and the number of photons is assumed to be conserved during the Raman scattering process. Here, a single laser beam propagates in the forward direction and generates two Raman scattered beams. These equations account for the conversion from the laser input wavelength to the first Stokes line and do not include conversions to other wavelengths.

The forward-propagating and backward-propagating Stokes beams are different. In a single cell, a Stokes beam is generated by forward scattering from the laser beam. The forward propagating Stokes beam travels through the cell with the laser beam and the photon density of the forward-scattered Stokes beam is limited by the initial photon density of the laser beam. For a collimated laser beam, where backward and spontaneous scattering are neglected, photon densities can be derived from Equations (5) and (7) as:

$$\eta_s^F = \frac{(\eta_{so}^F + \eta_{Lo})(\eta_{so}^F/\eta_L)\exp[(\eta_{so}^F + \eta_{Lo})\alpha z]}{1 + (\eta_{so}^F/\eta_{Lo})\exp[(\eta_{so}^F + \eta_{Lo})\alpha z]} \qquad \text{Eq. (8)}$$

and $$\eta_L = \frac{(1 + \eta_{Lo}/\eta_{so}^F)\eta_{Lo}\exp[-(\eta_{so}^F + \eta_{Lo})\alpha z]}{1 + (\eta_{Lo}/\eta_{so}^F)\exp[-(\eta_{Lo} + \eta_{so}^F)\alpha z]} \qquad \text{Eq. (9)}$$

where $\eta_{so}^F$ and $\eta_{Lo}$ are the initial photon densities for the initial forward Stokes and laser beams, respectively. When the pump beam is depleted, the maximum number of forward-scattered photons equals the sum of the initial Stokes and laser photons, and the pulse width of the Stokes beam is the same as the pulse width of the initial laser beam.

In contrast to the forward-scattered beam, the leading edge of the backward-scattered beam propagates through portions of the laser pulse that have not been depleted. This allows photon density of the leading edge of the backward-stimulated beam to increase above the photon density of the input beam. Using an analytical solution and stipulating the shape of the initiation conditions, the number of the backscattered photons per cross-sectional area $\eta_s^B$ and the full width at half maximum of the pulse $\delta$ are:

$$n_s^B \simeq 2\left[\eta_{Lo} - \left|\left(\frac{1}{\alpha}\right)\ln\left(\frac{\eta_{Lo}}{\eta_{so}^B}\right)\right|\right] \quad \text{Eq. (10)}$$

and $$\delta \simeq \frac{C_o}{\alpha \eta_{so}^B \exp(\alpha \eta_{Lo} L)} \quad \text{Eq. (11)}$$

where L is the cell length, the input Stokes radiation is much larger than the depleted laser beam $\eta_{so} \gg \eta_{Lo}\exp(-\eta_{Lo}\alpha L)$, and $C_o$ is a constant determined in part by the nature of the Raman initiation process. Equations (10) and (11) were derived in M. Maier, W. Kaiser, and J. A. Giordmaine, "Backward stimulated Raman scattering," Phys. Rev. 117, 580-599 (1969) for scattering in a single cell with a collimated laser beam.

Note that the first term in Eq. (10) is the total number of laser photons that have not yet been converted, and the second term represents the number of laser photons that have not converted. According to Eq. (10), as the initial photon density increases, the number of Stokes photons increases until in the limit all the photons in the laser beam are converted and the laser beam is depleted. Eq. (11) indicates that the leading edge of the backward-propagating Stokes pulse becomes shorter and more intense as the number of photons in the input beam is increased. While Maier et al. derived these results for Raman cells with liquid $CS_2$, the production of a short, intense leading edge pulse in deuterium gas could account for the optical damage reported W. Carnuth and T. Trickl, "A powerful eyesafe infrared aerosol lidar: application of stimulated Raman backscattering of 1.06 μm radiation," Rev. Sci. Instrum. 65, 3324-3331 (1994).

Raman scattering generated by a laser beam focused into methane was studied in G. I. Kachen and W. H. Lowdermilk, "Relaxation oscillations in stimulated Raman scattering," Phys. Rev. A 16, 1657-1664 (1977). They observed that the resulting backward scattering produced a series of pulses. A pulse is generated by the spontaneous scattering and amplified by the stimulated scattering primarily near the center of the cell where the laser beam is focused and ultimately the backward-scattering pulse depletes the laser beam and stops the Raman scattering. After the backward-propagating pulse travels beyond the region where the laser beam is tightly focused, the laser beam can again penetrate to the center of the cell and the Raman scattering generates another backward-propagating pulse. The time between pulses is estimated as:

$$\tau \approx (12 z_r c^{-1}) \quad \text{Eq. (12)}$$

where the Rayleigh range is $(z_r = \lambda_L f^2 a_l^{-1})$, $\lambda_L$ is the laser wavelength, f is the focal length, and $a_l$ is the cross sectional area of the laser beam entering the cell. The time between pulses, $\tau$, is typically less than 1 nanosecond. The optical damage reported by Carnuth and Trickl is also consistent with the production of a series of short, strong pulses.

A. Kazzaz, S. Ruschin, I. Shoshan, and G. Ravnitsky, "Stimulated Raman scattering in methane—experimental optimization and numerical model," IEEE J. Quantum Electron. 30, 3017-3024 (1994) presents a numerical finite difference model for the Raman scattering processes described in Eq. (5)-(7). This model can be used to study the interaction between two Raman cells, when modified to account for a focused beam in which the photon densities are not constant.

A one-dimensional model is:

$$N_s^{F[z_{i+1}, t_{j+1}]} = N_s^{F[z_i, t_j]} + NL[z_i, t_j](A[z_i]N_s[z_i, t_j] + B) \quad \text{Eq. (13)}$$

$$N_s^{B[z_{i-1}, t_{j+1}]} = N_s^{B[z_i, t_j]} + NL[z_i, t_j](A[z_i]N_s[z_i, t_j] + B) \quad \text{Eq. (14)}$$

$$N_{L[z_{i+1}, t_{j+1}]} = NL[z_i, t_j] - (N_s^{F[z_{i+1}, t_{j+1}]} - N_s^{F[z_i, t_j]}) - (N_s^{B[z_{i-1}, t_{j+1}]} - N_s^{B[z_i, t_j]}) \quad \text{Eq. (15)}$$

where N is the number of photons and is related to photon density by $N(z_i, t_j) = \eta(z_i, t_j)\Delta z a(z_i)$, the subscripts i and j denote discrete distance and time steps used in the model, $\Delta z$ is the distance step size, and $A[z_i]$ and B are the cross sections for stimulated and spontaneous scattering, and are equal to $A[z_i] = \alpha a^{-1}[z_i]$ and $B = \beta\Delta z$.

The cross sectional area of the beam is:

$$a[z_i] = \pi w^2[z_i] \quad \text{Eq. (16)}$$

where w is the beam radius. The beam is assumed to be quasi-Gaussian, with a uniform cross section and has a cross sectional radius of:

$$w[z] = w_o(1 + z^2/z_I^2)^{0.5} \quad \text{Eq. (17)}$$

where $w_o$ is the beam waist determined by the beam divergence ($\theta$), the focal length f of the focusing lens, and an adjustable factor (q), and $$w_o = \theta f q \quad \text{Eq. (18)}$$

and $z_I$ is determined from the measured beam size radius ($w_I$) that is input to the cell window as:

$$z_I = 0.5 L (w_I^2 w_o^{-2} - 1)^{-0.5}. \quad \text{Eq. (19)}$$

The adjustable factor (q) is used by Kazaaz et al. to scale the scattering of a uniform beam to the scattering properties of a Gaussian beam for one cell. In the following two-cell analysis, the equations from Kazzaz et al. are used with some modifications, and the analysis is done for the pump cell of the dual-cell system. The total output power of the Stokes beam ($P_s$) is found as:

$$P_s = \int_{r=0}^{r_1} 2\pi r I_s(r) dr \quad \text{Eq. (20)}$$

where r is the radius from the center of the beam, $I_s$ is the Stokes intensity, and $r_1$ is the radius of the aperture of the pump cell. The Stokes beam is assumed to be the result of stimulated emission, and the input laser beam is not depleted. The Stokes intensity at the cell exit window is $$I_s(r) = I_{so}\left[\int_{-l/2}^{l/2} g_R I_L(\zeta, r) d\zeta\right] \quad \text{Eq. (21)}$$

where $I_{so}$ is the initial Stokes beam from the seed cell, l is the interaction length scale in the middle of the pump cell, and $f$ is the distance from the cell center along the axis of propagation.

For a Gaussian intensity profile, the laser beam is:

$$I_L^G(r, f) = 2 P_L \pi^{-1} w^{-2}(f) \exp[-2 r^2 w^{-2}(f)], \quad \text{Eq. (22)}$$

where $P_L$ is the total laser power. In this case, the waist of the cross sectional radius ($w_o$) is assumed to be the product of the beam divergence ($\theta$) and focal length of the lens; the adjustable parameter (q) is unity.

For a uniform beam, the laser beam is characterized by:

$$I_L^U(r,f) = 4 P_L \pi^{-1} D_1^{-2}(f) \qquad \text{Eq. (23)}$$

when radial distance from the center of the beam is less than $D_1$. When the distance is greater than $D_1$, the intensity is zero. The size of the uniform beam is defined by the distance that contains 90% of the laser energy as follows:

$$D_1(f) = 2.2 w(f), \qquad \text{Eq. (24)}$$

where the cross-sectional radius (w) uses Equation 918) with the adjustable factor (q). An assumption that the power of the Stokes beam is the same at the exit window of the cell for both the uniform and Gaussian cases results in the equation:

$$\int_{r=0}^{r_1} r \exp\left(\int_{-l/2}^{l/2} g_r I_L^G d\zeta\right) dr = \int_{r=0}^{r_1} r \exp\left(\int_{-l/2}^{l/2} g_r I_L^U d\zeta\right) dr. \qquad \text{Eq. (25)}$$

Equation (25) can be solved numerically by adjusting the factor q.

For example, with a total laser power $P_L$ of 5 MW, and system parameters of Table 1 below, q is found to be approximately equal to 0.4. The other parameters used in Equation (25) can be derived from Table 1 below.

TABLE 1

| Laser | Nd:YAG (1064 nm) |
|---|---|
| Cell length | 100 cm |
| Focal length (pump cell) | 75 cm |
| Focal length (seed cell) | 100 cm |
| Energy split between pump and seed cell (%) | 70%-30% |
| Beam radius at cell entrance (pump cell) | 1.2 cm |
| Beam radius at cell entrance (seed cell) | 0.4 cm |
| Beam waist (pump cell) | $3.75 \times 10^{-2}$ cm |
| Beam waist (seed cell) | $5.0 \times 10^{-2}$ cm |
| Raman stimulated emission coefficient ($\alpha$) | $1.41 \times 10^{-18}$ cm$^2$ photon$^{-1}$ |
| Raman spontaneous emission coefficient ($\beta$) | $5.97 \times 10^{-2}$ cm$^{-1}$ sr$^{-1}$ |
| Divergence angle for laser beam | 0.5 mrad |
| Divergence angle for 1560 nm beam | 0.5 mrad |

A dual Raman-cell system in accordance with the Table 1 characteristics and description above has been tested. A beamsplitter directs 30% of the original laser beam into the seed cell with the remainder going to the pump cell. Both the seed cell and the pump cell are filled with deuterium at 25 atm pressure, and are one meter in length. A planoconvex lens with a 100-cm focal length focuses the light into the center of the seed cell. The backscattered Stokes beam passes back through the lens and is reflected by dichroic mirrors into the pump cell. A planoconvex lens with a 100-cm focal length is used to focus the seed Stokes beam into the center of the pump cell. The pump laser pulse is focused by a planoconvex lens with a 75-cm focal length and enters the pump cell at the same time as the seed cell Stokes beam; the two beams propagate in opposite directions through the pump cell. An output Raman pulse is generated that is composed of both an amplified seed beam and the Stokes beam backscattered from the laser beam. The distance from the laser to the seed cell is 4 m and from the laser to the pump cell is 6 m. The optical path length is adjusted as necessary to ensure the Stokes pulses and the input laser pulses will meet in the pump cell at the same time, as shown in FIG. 4.

Both the Stokes seed beam and the pump laser beam are aligned so that the Stokes seed beam and the pump laser beam will pass through a pinhole at the pump cell center and a second alignment guide located further down the beam path. Referring again to FIG. 1B, which shows the position of irises and pinholes used for aligning the system, the initial alignment is done with just the two low power 1064 nm beams. Both cells 14 and 16 are removed. Irises with a ½ inch diameter slightly smaller than the input beam are located in the optical path before the seed cell and the pump cell, and after the minor 26. Then each input beam 12 is aligned to pass through the iris 65 before the seed cell and iris 63 before the pump cell and each beam is aligned to pass through pinholes 61 and 62 that are placed in the locations where the center of the cells 14 and 16 will be. Next, the pinhole 61 for the seed cell is removed, the seed cell 14 is put in place, and the 1064 nm pump beam is blocked. A high power 1064 nm seed beam is focused into the seed cell 14. A 1560 nm seed beam is generated which is redirected by dichroic mirrors 24 and 26 into the location where the pump cell 16 will be. This 1560 nm seed beam is aligned to pass through the iris after mirror 26 and through the pinhole 62 at the location of the center of the pump cell. At this point the 1560 nm seed beam will also pass through the iris 63 located after output window 32. The dual cell system is now aligned. All irises and the pinholes are removed, the 1064 pump beam is unblocked and the pump cell 16 is put in place. The dual Raman cell system can now operate at full power. Note that the irises can remain in the system in operation, however, they will slightly clip the 1064 nm laser beam, resulting in a slight reduction in the maximum power of the system.

Figure 4:
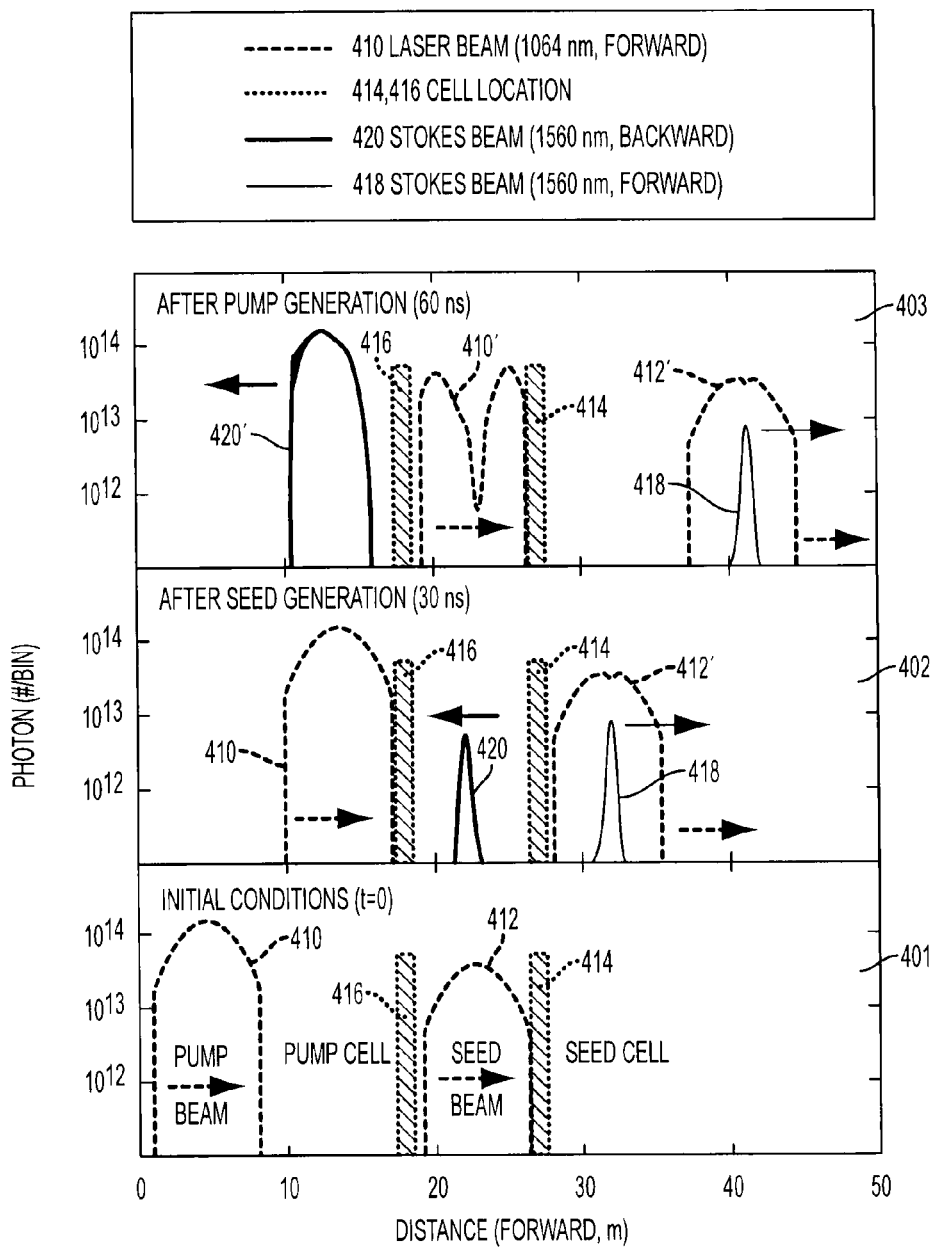
FIG. 4 illustrates results of a computer simulation of the Stokes beams being generated by the two Raman cells.

FIG. 4 illustrates results of a computer simulation of the Stokes beams being generated by the two Raman cells described above arranged with the Table 1 parameters. Equations (13)-(15) were used in the calculation with a step size of 20 microns. The initial pulses at t=0 have a Gaussian dependence with a pulse length (full width half maximum [FWHM]) of 3.1 meters. The seed cell 414 is arranged so its backward Raman scattered Stokes output beam is input to the pump cell 416 in the manner discussed above and as shown in FIG. 1A, FIG. 2, and FIG. 3.

The bottom panel 401 of FIG. 4 shows the pump laser pulse 410, which is the portion of the initial 1064 nm laser beam moving toward the pump cell 416. The seed laser pulse 412 is the remainder of the initial 1064 nm laser beam 412 moving into the seed cell 414. Note that the intensity of the pump laser pulse 410 is larger than the intensity of portion of the seed laser pulse 412. The middle panel shows the status and profile of the pulses after seed pulse generation at approximately 30 ns. The seed cell 414 generates two 1560-nm pulses as the seed laser pulse 412 passes through the seed cell: the forward propagating 1560 nm Stokes pulse 418; and the backward propagating 1560 nm Stokes pulse 420.

The top panel 403 of FIG. 4 shows the pulse characteristics after the backward scattered Stokes pulse 420 and the 1064 nm pump laser pulse 410 pass through the pump cell 414, at approximately 60 ns. The 1560 nm output pulse 420' from the pump cell 416 is a combination of the amplified Stokes pulse 420 and a backscattered Stokes pulse generated by introducing the pump beam 410 into the pump cell 416. The pump cell's output pulse 420' has a higher intensity than the backscattered Stokes pulse 420, and a shorter length than the pump pulse 410. Note that although both forward- and backward-propagating pulses at 1560 nm are generated by the pump cell 416, the forward pulse is too weak to be plotted in the top panel.

Figure 5:
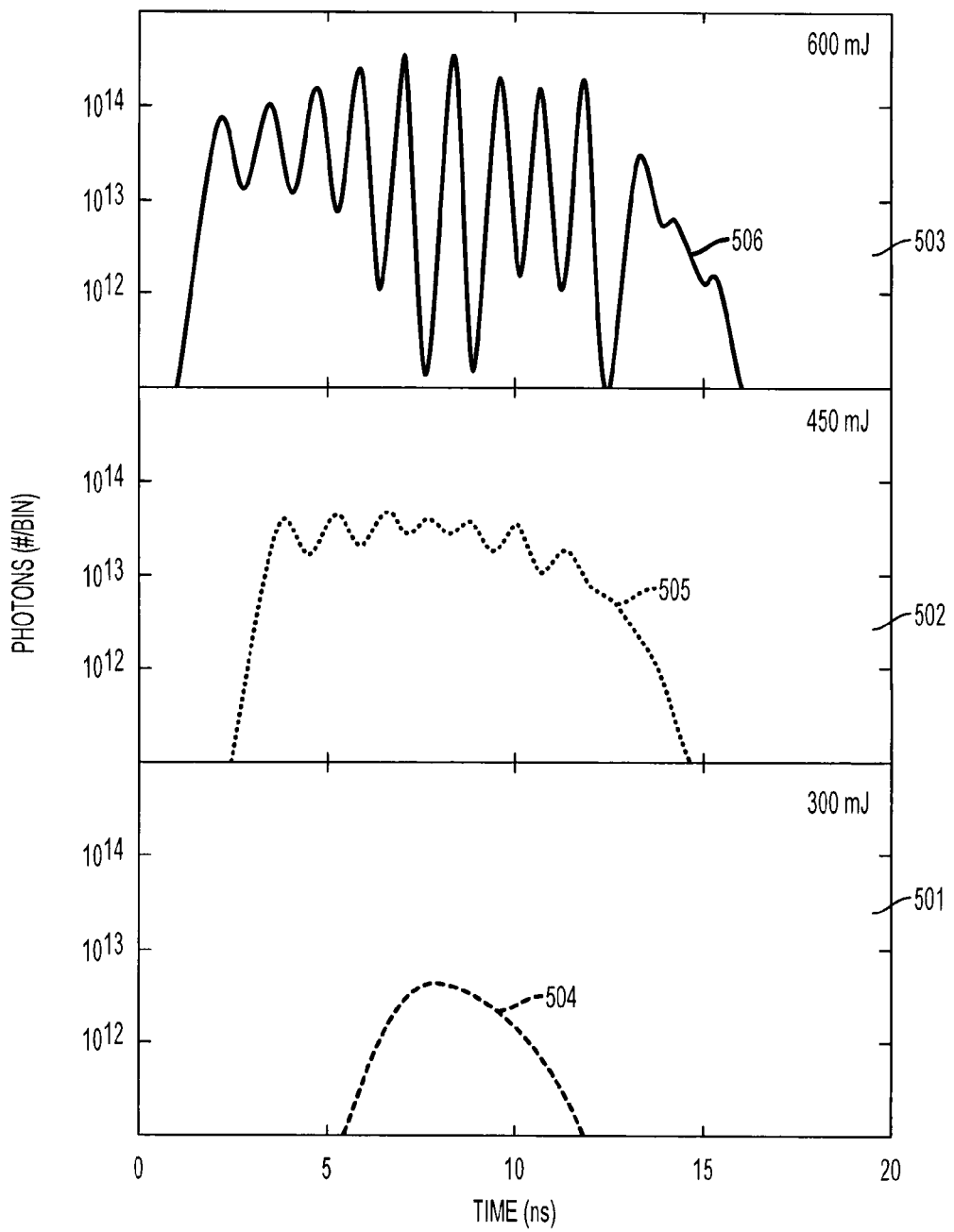
FIG. 5 shows the pulse profile resulting from a computer simulation for a single high pressure, deuterium-filled Raman cell at three different input pulse laser energy levels.

FIG. 5 shows the results of a computer simulation for a single high pressure, deuterium-filled Raman cell modeled after the pump cell discussed above, at three input energy levels: 300 mJ/pulse, 450 mJ/pulse, and 600 mJ/pulse. The lower panel 501 shows the backward-propagating beam having a total energy of 2.4 mJ/pulse and not oscillating 504, resulting from a 300 mJ/pulse input laser pulse. The middle panel 502 shows the backward-propagating pulse having an energy of 28 mJ/pulse, oscillations 505 with an oscillation amplitude (maximum/minimum) of 1.6, and a time scale of the oscillations of approximately 2.8 ns, resulting from 450 mJ/pulse input laser pulse. The top panel 503 shows the backward-propagating pulse having an energy of 97 mJ/pulse, much larger oscillations 506 with an oscillation amplitude of 2600, and a time scale for oscillations of approximately 2.6 ns.

To reduce the risk of optical damage to the system single 1560 nm pulses without oscillations are preferred. The simulation results of FIG. 5 suggest that a single Raman cell with these parameters should be operated at an input energy level of less than 450 mJ/pulse.

Figure 6A:
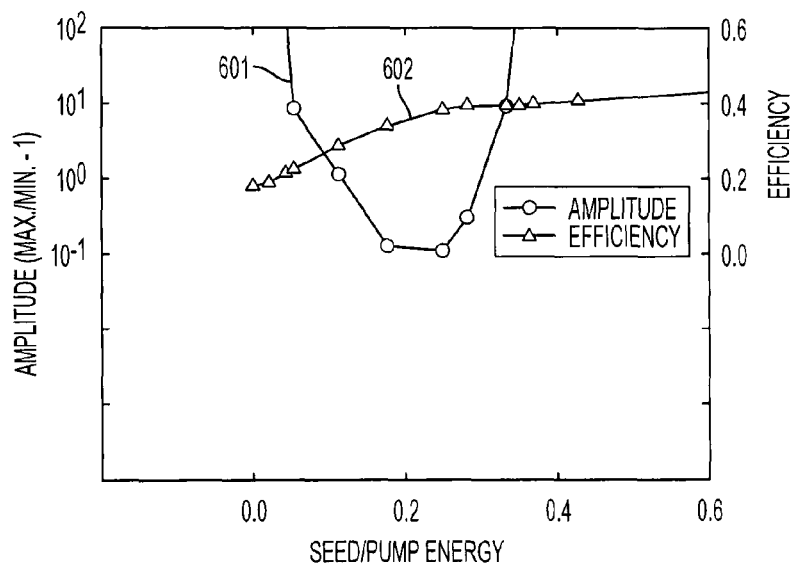
FIG. 6A shows oscillation amplitude and efficiency of a dual-Raman cell optical pulse generator, fixed pulse energies, and varied energy split between the two cells.

FIG. 6A shows results of computer simulations for two Raman cells using fixed pulse energies, and varying the energy split between the two cells. The upper portion of the figure plots the oscillation amplitude 601 and efficiency 602 of the dual cell system as a function of the ratio of seed laser pulse to pump laser pulse energies.

Figure 6B:
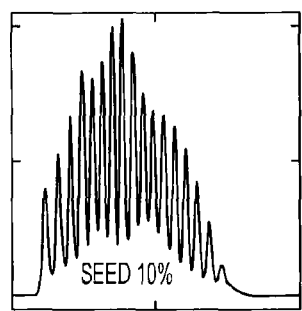
FIGS. 6B, 6C, and 6D show the pulse shape of the output beam from the two cells for energy splits of 10% into the seed cell, 25% into the seed cell, and 33% into the seed cell, respectively.
Figure 6C:
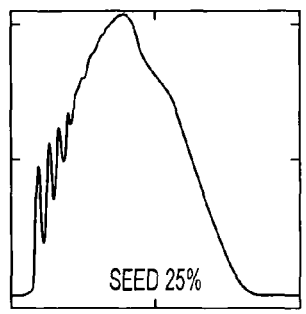
Figure 6D:
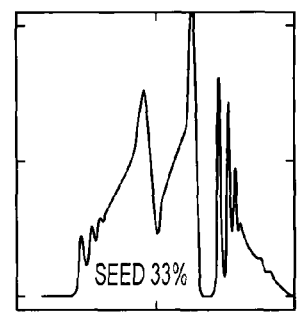

FIGS. 6B, 6C, and 6D show the pulse shape of the beam output from the two cells for energy splits of 10% into the seed cell, 25% into the seed cell, and 33% into the seed cell, respectively. Note that large oscillations occur for the simulations in which the seed energies are 10% and 33%. However, the seed energy of 25% case shows no large oscillations. This result is consistent with the FIG. 6A plot of oscillation amplitude 601, which shows a minimum in the oscillation amplitude between about 18% and about 26%. Note also that the efficiency increases as the seed energy to pump energy ratio increases, suggesting that for greater efficiency, maximum possible ratio of seed energy to pump energy should be used. The system can be designed with a maximum energy split that is also consistent with small oscillations.

A dual-cell system was assembled and tested. The laser source is a seeded Nd:YAG laser, model Continuum 8010, commercially available from Continuum Lasers, Inc., headquartered in Santa Clara, Calif., USA. The laser was operated at 10 Hz. Tests were done with beamsplitters, varying the ratio of the energy-to-pulse input into the seed and pump cells between 20% and 40%.

Figure 7:
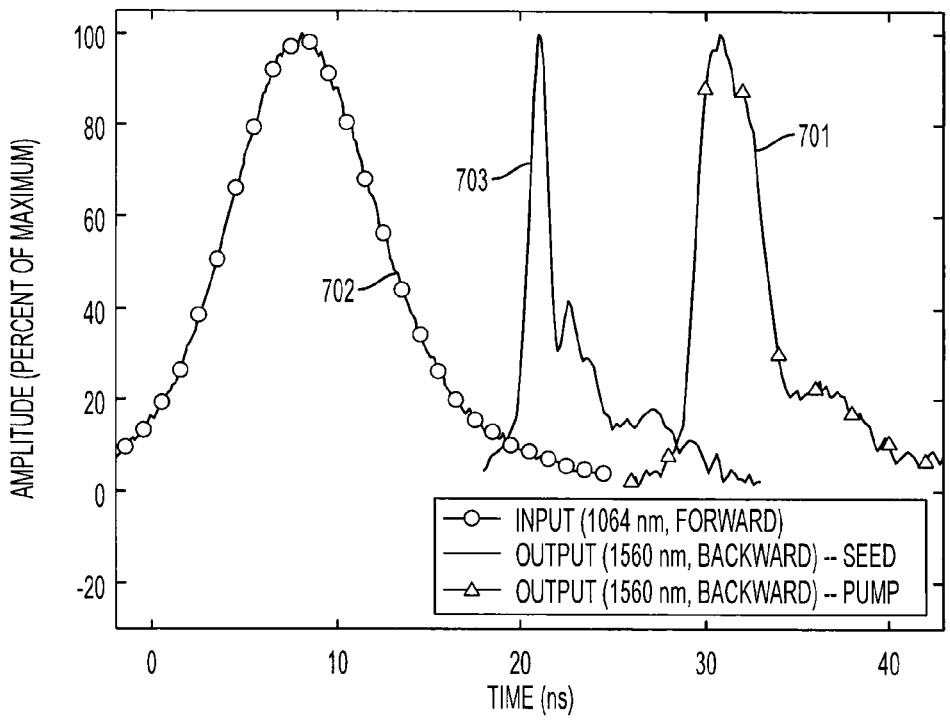
FIG. 7 shows the measured waveforms for the 1064 nm input laser beam, the 1560 nm output of the seed cell, and the 1560 nm output of the pump cell for the dual Raman cell system.

FIG. 7 shows the measured waveforms for the 1064 nm input laser beam, the 1560 nm output of the seed cell, and the 1560 nm output of the pump cell for the dual Raman cell system. The curve 701 shows the 1560 nm backscattered output pulses from the pump laser are well formed when the system used a 35% beamsplitter with a laser input of 600 mJ/pulse at 1064 nm. The FWHM is 9.5, 4.0, and 1.2 ns for the 1064 nm laser pulse 702, the output Stokes pump pulse at 1560 nm 702, and Stokes seed 1560 nm pulse 703, respectively.

Figure 8:
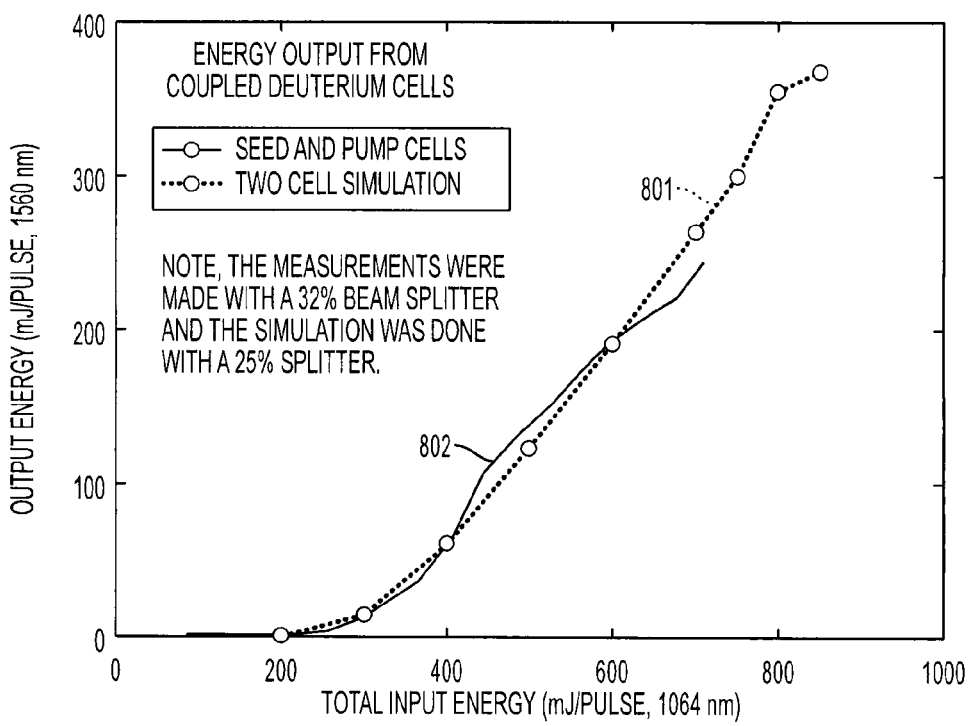
FIG. 8 compares the output energy plotted as a function of the total input laser energy for the test measurements and the computer simulation for the dual Raman cell system.

FIG. 8 shows the output energy plotted as a function of the total input laser energy for measurements 802 and the two-cell simulation 801 discussed above. Note that the measurements used a 32% beamsplitter, while the simulation is based on a 25% beamsplitter. To make these measurements, the input energy is gradually increased until visual detection of anti-Stokes radiation. For simulations, the input energy was increased until the output waveform oscillated. The simulation indicates that the cells could produce 380 mJ/pulse at 1560 with an efficiency of 45%; however, the actual measurements were stopped when the anti-Stokes radiation was detected. This occurred at 250 mJ/pulse with an efficiency of 35%.

Note that a different pulse repetition rate than 10 Hz can be used. Operating at different pulse repetition rates may require a realignment of the 1064 and 1560 beams using the iris and pinholes as discussed above; however, the location of the lens, minors and cells remains the same. It should be noted that higher pulse repetition rates can induce thermal lensing in the Raman cells, which can damage the system optics. Lower pulse repetition rates are also possible. For example, this system above also operates well with a 7 Hz laser.

The simulations can be useful for understanding the dynamics of the Raman conversion process; however, the accuracy of the simulations can be limited due to secondary conversion processes (secondary Stokes conversion, anti-Stokes conversion, etc.) that are not included in the model. Although the dual-cell simulations accurately predict the conversion efficiency at lower powers, the maximum power of the dual cell operation may be limited by the anti-Stokes generation.

Note that while FIG. 2 and FIG. 3 illustrate several arrangements for distributing the input laser beam to the seed cell and the pump cell, and for transferring the output Stokes pulse from the seed cell to the pump cell, other arrangements, and different optical elements are possible.

Obviously, many modifications and variations of the present invention are possible in light of the above teachings. It is therefore to be understood that the claimed invention may be practiced otherwise than as specifically described.

What is claimed as new and desired to be protected by Letters Patent of the United States is:

1. An optical system for converting a pulsed beam of irradiation from a laser operating at a first wavelength to a pulsed beam of irradiation at a different second wavelength, the system comprising:
    a first Raman cell filled with a Raman-active gas;
    a second Raman cell filled with the Raman-active gas; and
    a beamsplitter arranged to split the pulsed laser beam at the first wavelength into a first portion and a second portion, to transmit the first portion into the first Raman cell without first passing through the second Raman cell, and to transmit the second portion into the second Raman cell without first passing through the first Raman cell;
    the second Raman cell arranged to receive a backward-propagating Stokes pulsed beam from the first Raman cell and to receive the second portion of the pulsed laser beam from the beamsplitter, said backward-propagating Stokes pulsed beam from the first Raman cell and said second portion of the pulsed laser beam entering the second cell in opposite directions, said second Raman cell adapted to generate an output pulsed beam at the second wavelength.

2. The optical system according to claim 1, wherein the output pulsed beam at the second wavelength comprises an amplified backward-propagating Stokes pulse and a backscattered Stokes pulse.

3. The optical system according to claim 1, further comprising:
    a first lens arranged to focus the first portion of the pulsed laser beam into the center of the first Raman cell;
    a second lens arranged to focus the backward-propagating Stokes pulsed beam into the center of the second Raman cell; and
    a third lens arranged to focus the second portion of the pulsed laser beam into the center of the second Raman cell.

4. The optical system according to claim 1, wherein the energy of the first portion of the input pulsed laser beam directed into the first Raman cell is less than the energy of the second portion of the input pulsed laser beam directed into the second Raman cell.

5. The optical system according to claim 1, wherein the ratio of the energy of the first portion of the input pulsed laser beam directed into the first Raman cell and the energy of the second portion of the input pulsed laser beam directed into the second Raman cell is at least 10% and at most 35%.

6. The optical system according to claim 1, wherein the ratio of the energy of the first portion of the input pulsed laser beam directed into the first Raman cell and the energy of the second portion of the input pulsed laser beam directed into the second Raman cell is at least 18% and at most 26%.

7. The optical system according to claim 1, wherein the ratio of the energy of the first portion of the input pulsed laser beam directed into the first Raman cell and the second portion of the energy of the input pulsed laser beam directed into the second Raman cell is about 25%.

8. The optical system according to claim 1, wherein the Raman-active gas is hydrogen, tritium, or deuterium.

9. The optical system according to claim 1, wherein the Raman-active gas is deuterium.

10. The optical system according to claim 1, wherein the deuterium gas in the Raman cells has a pressure of at least 10 atmospheres.

11. The optical system according to claim 1, wherein the first wavelength is about 1064 nm and the second wavelength is about 1560 nm.

12. The system according to claim 1, wherein the second wavelength is longer than the first wavelength.

13. The system according to claim 1, wherein the second wavelength is in a range of 1400 nm to 2000 nm.

14. An optical system for converting a pulsed beam of irradiation from a laser operating at a wavelength of about 1064 nm to a pulsed beam of irradiation at about 1560 nm, the system comprising:
a first Raman cell filled with deuterium gas;
a second Raman cell filled with deuterium gas; and
a beamsplitter arranged to split the pulsed beam of irradiation from the laser into a first portion and a second portion, to transmit the first portion to the first Raman cell without first passing through the second Raman cell, and to transmit the second portion to the second Raman cell without first passing through the first Raman cell;
the second cell arranged to receive a backward-propagating Stokes pulsed beam from the first Raman cell at 1560 nm wavelength, with the backward-propagating Stokes beam entering the second cell in a direction opposite to the direction of travel of first portion of the incoming 1064 nm laser pulsed beam;
said second Raman cell adapted to generate an output pulsed beam at 1560 nm wavelength.

15. A method for converting a pulsed beam of irradiation from a laser operating at a first wavelength to a pulsed beam of irradiation at a different second wavelength, the method comprising:
providing a pulsed laser beam;
splitting the pulsed laser beam into a first portion and a second portion;
transmitting the first portion into a first Raman cell filled with a Raman-active gas without first passing through a second Raman cell;
transmitting the second portion into the second Raman cell filled with the Raman-active gas without first passing through the first Raman cell;
the second cell receiving a backward-propagating Stokes pulse beam from the first Raman cell at the second wavelength, the backward-propagating Stokes pulsed beam entering the second cell in a direction opposite to the direction of travel of the second portion of the incoming laser pulses at the first wavelength;
said second Raman cell generating an output pulsed beam at the second wavelength traveling in the direction opposite to the direction of travel of the incoming second portion of the laser pulses at the first wavelength.

* * * * *